United States Patent [19]

Tsurusaki et al.

[11] Patent Number: 5,335,270
[45] Date of Patent: Aug. 2, 1994

[54] BELL SIGNAL GENERATING CIRCUIT

[75] Inventors: Masayuki Tsurusaki; Takashi Watanabe, both of Hino, Japan

[73] Assignee: Kabushiki Kaisha Toshiba, Kanagawa, Japan

[21] Appl. No.: 108,282

[22] Filed: Aug. 19, 1993

[30] Foreign Application Priority Data

Aug. 20, 1992 [JP] Japan .................................. 4-221740

[51] Int. Cl.⁵ ............................................. H04M 3/02
[52] U.S. Cl. ................................... 379/253; 379/251; 379/252
[58] Field of Search ................. 379/251, 252, 253, 418

[56] References Cited

U.S. PATENT DOCUMENTS 4,340,785  7/1982  Awadalla ............................ 379/418
4,656,659  4/1987  Chea, Jr. ............................. 379/253

Primary Examiner—James L. Dwyer
Assistant Examiner—Michael N. Lau
Attorney, Agent, or Firm—Finnegan, Henderson, Farabow, Garrett & Dunner

[57] ABSTRACT

A bell signal generating circuit for a key telephone set. A dc component of a pulse signal is removed by a photo-coupler to generate a first signal. A high frequency component of the first signal is removed by a filter to generate a second signal. A differential amplifier amplifies the second signal to generate a bell signal. To the differential amplifier, a dc supply voltage based on the dc signal in synchronism when the pulse signal is applied.

3 Claims, 5 Drawing Sheets

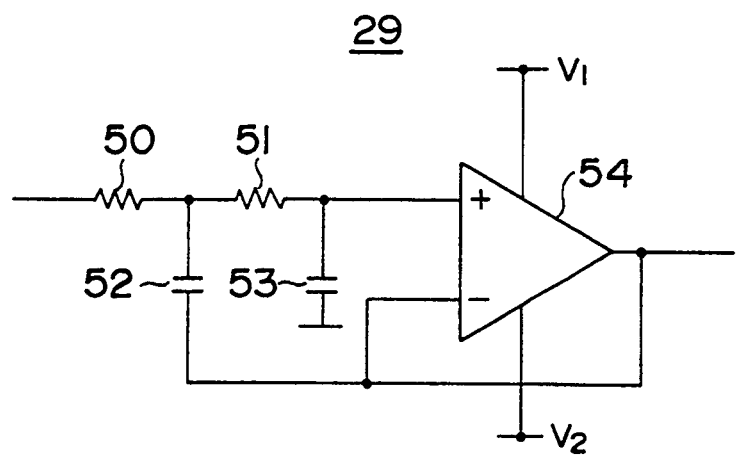
F I G. 6
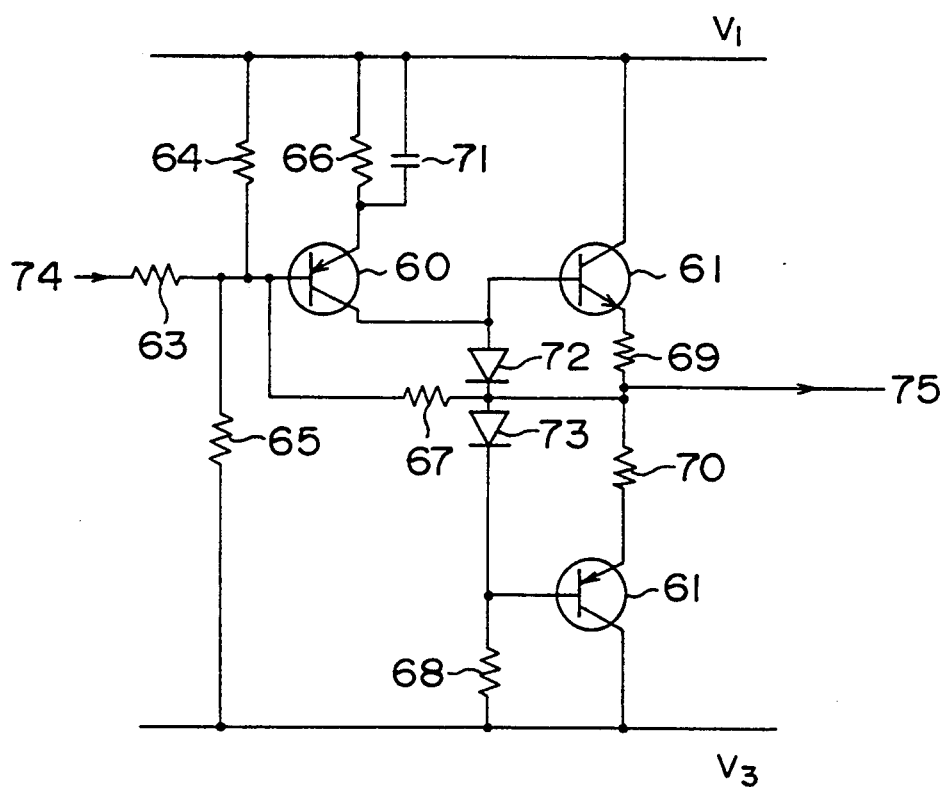
F I G. 7

BELL SIGNAL GENERATING CIRCUIT

BACKGROUND OF THE INVENTION

1. Field of the Invention

The present invention relates to a bell signal generating circuit, and more specifically to a bell signal generating circuit for generating a bell signal in differential manner.

2. Description of the Prior Art

In general, a key service unit or a PBX (private branch exchange) for key telephone sets is provided with a bell signal generating circuit 10 as shown in FIG. 1. The bell signal generating circuit 10 is composed of a pulse signal: oscillator 11, a driver circuit 12, and a step-up transformer 13. The pulse signal oscillator 11 generates a low-frequency (20 Hz) pulse signal of 5 Vp-p. The output of the pulse signal oscillator 11 is supplied to the primary winding 13a of the step-up transformer 13 via the driver circuit 12. The secondary winding 13b of the step-up transformer 13 is connected to a dc voltage supply 14, so that a dc voltage can be superposed upon the pulse signal. As a result, a step-up pulse signal of 160 Vp-p can be obtained between two output terminals 15a and 15b of the step-up transformer 13, as shown in FIG. 2.

In the bell signal generating circuit 10 as described above, however, since the pulse signal of 5 Vp-p is stepped up in voltage to the pulse signal of 160 Vp-p, there exists a problem in that the size of the step-up transformer 13 is larger and therefore a large mounting space is inevitably required.

In addition, since the bell signal generating circuit 10 generates a square pulse signal, there exists another problem in that the key telephone set cannot recognize the generation of the bell signal, reliably.

SUMMARY OF THE INVENTION

With these problems in mind, therefore, it is the object of the present invention to provide an improved bell signal generating circuit.

To achieve the above-mentioned object, the present invention provides a bell signal generating circuit, comprising: means for generating a pulse signal and a direct current signal in synchronism with the pulse signal; a photo-coupler for removing a direct current component of the pulse signal to output a first signal; a filter connected to the photo-coupler, for removing higher harmonics of the first signal to output a second signal; a differential amplifier connected to the filter, for differentially amplifying the second signal to output a bell signal; and means, responsive to the direct current signal, for applying a direct current supply voltage to the differential amplifier.

Further, the present invention provides a method of generating a bell signal for a key telephone set, comprising the steps of: generating a pulse signal and a direct current signal in synchronism with the pulse signal; removing a direct current component of the pulse signal to output a first signal; removing higher harmonics of the first signal to output a second signal; differentially amplifying the second signal to output a bell signal by a differential amplifier; and applying a direct current supply voltage to the differential amplifier in response to the direct current signal.

The pulse signal generated by the output means is supplied to the next stage, under insulated condition from the dc standpoint, through the photo-coupler; and further the higher harmonics of the pulse signal are removed through the filter. The pulse signal thus obtained is supplied to the differential amplifier to generate an alternate bell signal. Further, a high frequency signal is generated based on a dc signal generated by the output means in synchronism with the pulse signal. This high frequency signal is increased by a high frequency transformer in voltage. The voltage-increased high frequency signal is rectified and applied to the differential amplifier as a dc supply voltage.

Therefore, it is possible to reduce the size of the transformer and to allow the telephone sets to recognize the generation of the bell signal reliably.

BRIEF DESCRIPTION OF THE DRAWINGS

FIG. 6 is a circuit diagram showing the low-pass filter of the bell signal generating circuit shown in FIG. 3; and FIG. 7 is a circuit diagram showing the inverter amplifier of the bell signal generating circuit shown in FIG. 3.

DETAILED DESCRIPTION OF THE PREFERRED EMBODIMENTS

An embodiment of the bell signal generating circuit according to the present invention will be described hereinbelow with reference to the attached drawings.

Figure 1:
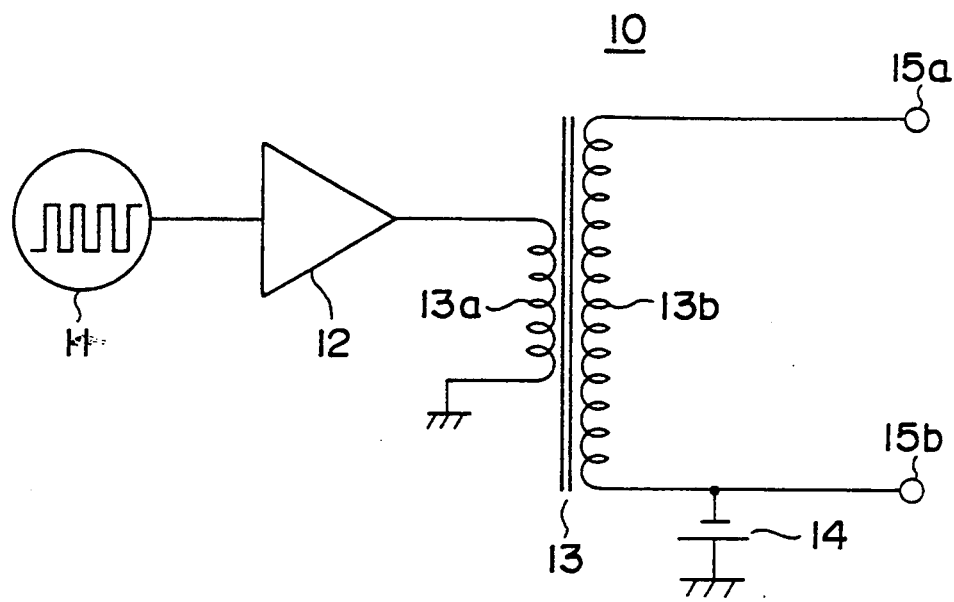
FIG. 1 is a circuit diagram showing the essential portion of an example of the conventional bell signal generating circuit.
Figure 2:
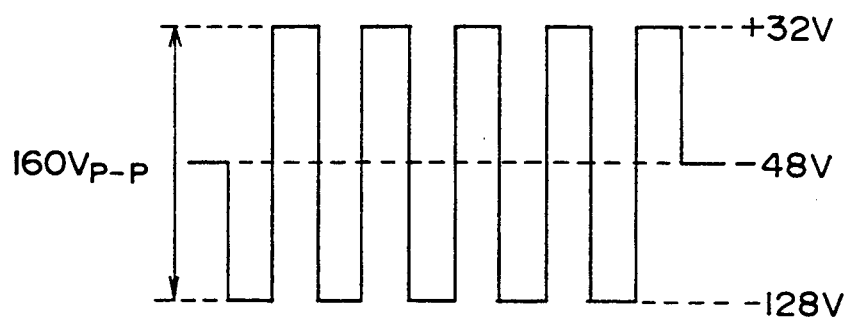
FIG. 2 is a signal waveform diagram of the conventional bell signal generating circuit shown in FIG. 1.
Figure 3:
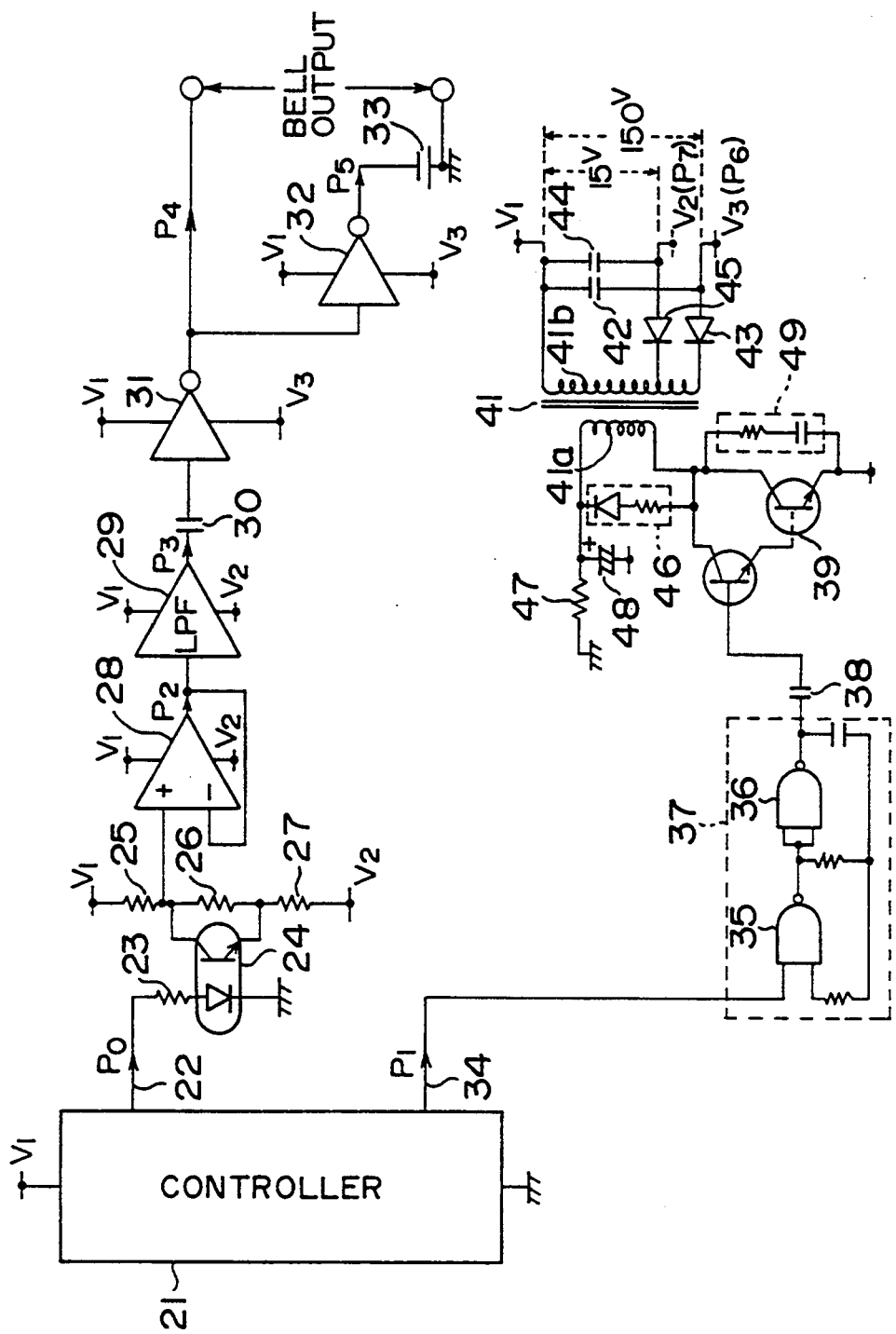
FIG. 3 is a block diagram showing an embodiment of the bell signal generating circuit according to the present invention.

In FIG. 3, a bell signal generating circuit 20 is composed of a control circuit 21, a photo-coupler 24, a voltage follower amplifier 28, a low-pass filter 29, a first inverter amplifier 31, a second inverter amplifier 32, an oscillating circuit 37, a capacitor 38, a switching circuit 39, a high frequency transformer 41, etc.

Figure 4A:
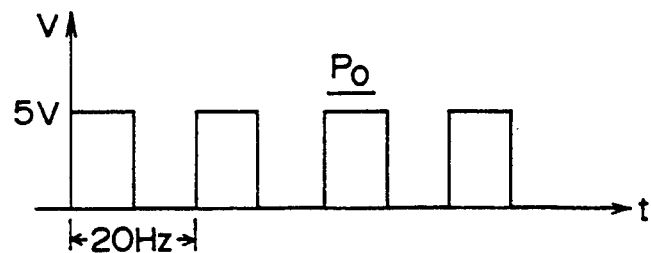
FIGS. 4A to 4E are signal waveform diagrams for assistance in explaining the operation of the bell signal generating circuit shown in FIG. 3.

The control circuit 21 includes a pulse signal generating circuit (not shown) for generating a low frequency (20 Hz) pulse signal P0 of 5 Vp-p, as shown in FIG. 4A. Further, the control circuit 21 includes a dc voltage supply (not shown) for generating a dc supply voltage P1 of 5 V in synchronism with the pulse signal P0.

Figure 4B:
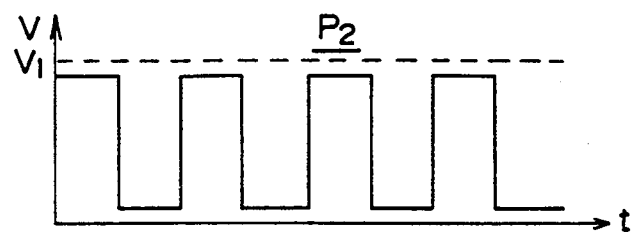

The photo-coupler 24 includes a light emitting diode and a light receiving transistor. One (upper) terminal 22 of the control circuit 21 is connected to the light emitting diode via a resistor 23 to supply the pulse signal P0. The light receiving transistor is connected to three resistors 25, 26 and 27. Therefore, the dc component of the pulse signal P0 is insulated by the photo-coupler 24. The three resistors 25, 26 and 27 are connected to the voltage follower amplifier 28 so that a predetermined pulse signal P2 as shown in FIG. 4B can be obtained. The voltage follower amplifier 28 is connected to the low-pass filter 29 to obtain an alternate signal P3 as shown in FIG. 4C, from which higher harmonics are removed.

Figure 4C:
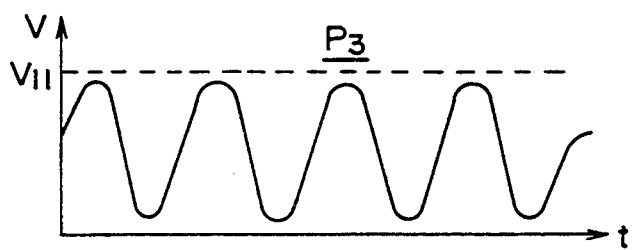
Figure 4D:
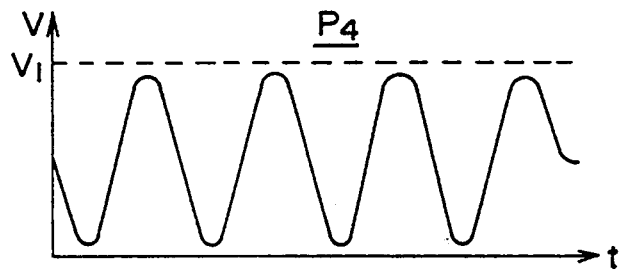
Figure 4E:
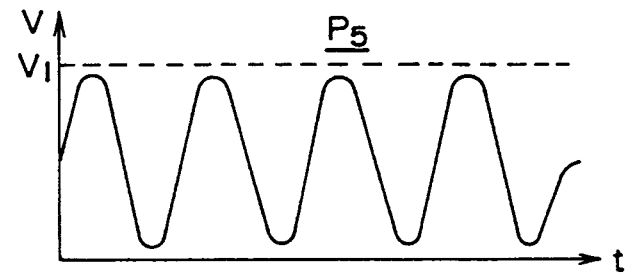

The low-pass filter 29 is connected to the first inverter amplifier 31 via the capacitor 30 to obtain an amplified sine wave signal P4 as shown in FIG. 4D, which is 180 degrees out of phase with respect to the alternate signal P3 as shown in FIG. 4C. The first inverter amplifier 31 is connected to the second inverter amplifier 32 to obtain a sine wave difference signal P5 as shown in FIG. 4E, which is 180 degrees out of phase with respect to the sine wave signal P4 as shown in FIG. 4D. The inverter amplifier 32 is connected to a dc voltage supply 33 of −24 V to obtain a bell output signal of 226 Vp-p, as shown in FIG. 5D. Here, the two inverter amplifiers 31 and 32 constitute a differential amplifier.

The other (lower) terminal 34 of the control circuit 21 is connected to the oscillator circuit 37. The oscillation circuit 37 is composed of two series-connected NAND circuits 35 and 36, to which the dc voltage P1 of 5 V is supplied in synchronism with the pulse signal P0 as shown in FIG. 4A. The oscillator circuit 37 is connected to the capacitor 38 and further to the switch circuit 39 composed of two NPN transistors, to supply the high frequency signal to the primary winding 41a of the high frequency transformer 41.

Figure 5A:
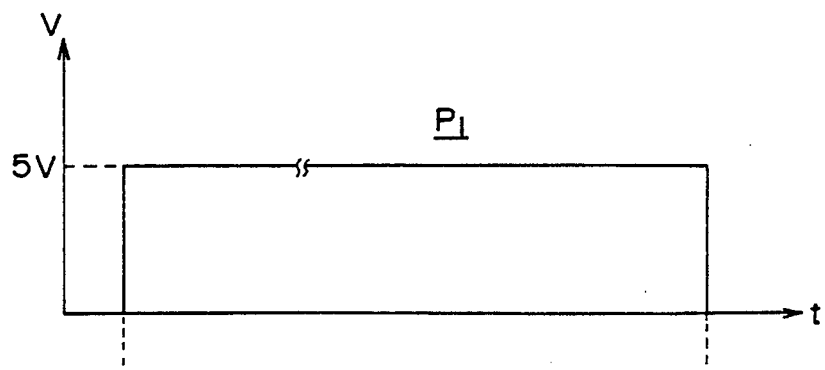
FIGS. 5A to 5D are other signal waveform diagrams for assistance in explaining the operation of the bell signal generating circuit shown in FIG. 3.
Figure 5B:
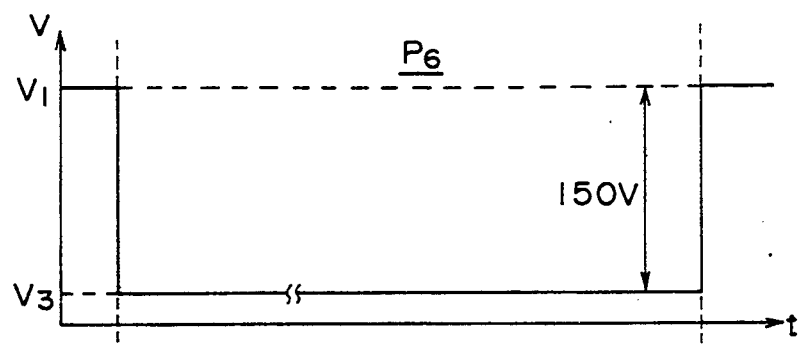
Figure 5C:
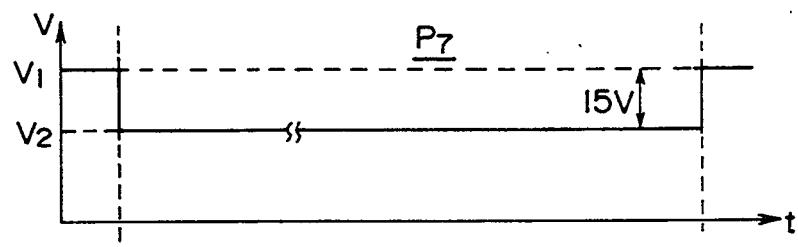
Figure 5D:
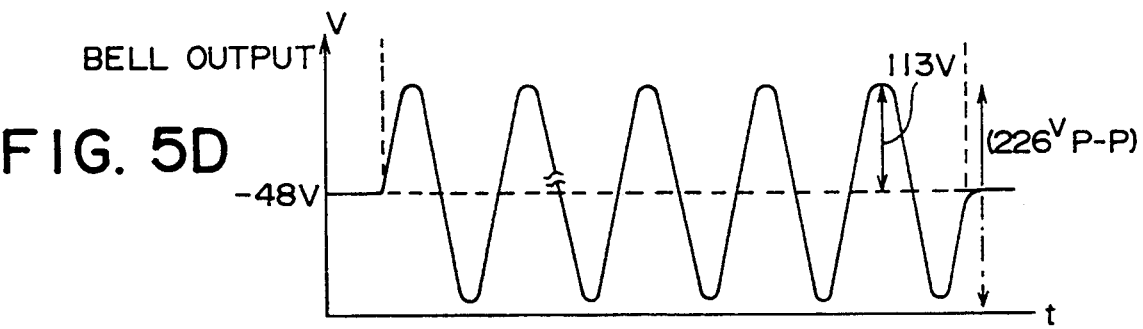

One (lower) terminal of the secondary winding 41b of the high frequency transformer 41 is connected to a first output terminal (V3) via a capacitor 42 and a diode 43 to generate a dc voltage P6 of 150 V as shown in FIG. 5B, and the other terminal (upper) of the secondary winding 41b thereof is connected to a second output terminal V2 via capacitor 44 and a diode 45 to generate a dc voltage P7 of 15 V as shown in FIG. 5C.

Further, a recovery circuit 46 composed of a resistor and a diode is connected between two terminals of the primary winding 41a of the high frequency transformer 41. The one end of the recovery circuit 46 is grounded via a resistor 49 and a capacitor 48. Further, a snubber circuit 49 composed of a resistor and a capacitor is connected between emitter and collector terminals of the NPN transistors of the switch circuit 39.

FIG. 6 is a more detailed circuit diagram showing the low-pass filter 29 shown in FIG. 3. The low-pass filter 29 is composed of resistors 50 and 51, capacitors 52 and 53, and an operational amplifier 54, in order to output a low-frequency signal including no high frequency components.

FIG. 7 is a more detailed circuit diagram showing the inverter amplifier 31 or 32 shown in FIG. 3. The inverter amplifier 31 or 32 is composed of PNP transistors 60 and 61, an NPN transistor 62, resistors 63, 64, 65, 66, 67, 68, 69 and 70, a capacitor 71, and diodes 72 and 73, in order to invert a positive signal inputted to an input terminal 74 thereof into a negative signal outputted from an output terminal 75 thereof or vice versa.

The operation of the bell signal generating circuit 20 thus constructed will be described hereinbelow with reference to FIGS. 4A to 4E and FIGS. 5A to 5D. When the pulse signal P0 as shown in FIG. 4A is supplied to the photo-coupler 24, a pulse signal including no dc component is developed across the resistor 26. The developed pulse signal is transmitted to the voltage follower amplifier 28, amplified thereby and then outputted therefrom as the pulse signal P2 as shown in FIG. 4B. The amplified pulse signal P2 is supplied to the low-pass filter 29 to output a sine wave signal P3 having no higher harmonics, as shown in FIG. 4C.

The dc component of the sine wave signal P3 is removed through the capacitor 30, and then supplied to the inverter amplifier 31. Here, in the inverter amplifier 31, if resistance of R(resistor)63 < < resistance of R64, R65 and: further resistance of R67/resistance of R63 < < $\omega c$ × resistance of R68 (where $1/\omega c$ < < resistance R66; $\omega = 2\pi f$; c = capacitance of C(capacitor)71; and f = 20 Hz), the gain of the inverter amplifier 31 can be determined by resistance (R67)/resistance (R63). The inverter amplifier 31 outputs the output signal P4 as shown in FIG. 4D. The output signal P4 is further inverted in phase through the inverter amplifier 32 to output the output signal P5 as shown in FIG. 4E.

Here, if the output signal P4 of the inverter amplifier 31 is determined to be 113 Vp-p and the output signal P5 of the inverter amplifier 32 is determined to be 113 Vp-p, it is possible to obtain a difference voltage signal 226 Vp-p (= 80 V rms). Therefore, where a dc voltage of −48 V is further superposed upon the difference voltage signal, a bell output signal as shown in FIG. 5D can be obtained.

On the other hand, the dc voltage P1 is supplied from the control circuit 21 to the oscillation circuit 37 in synchronism with the pulse signal P0. On the basis of the signal P1, the oscillator circuit 37 generates a high frequency signal determined by the resistance and capacitance values of the oscillator circuit 37. The dc component of the high frequency is cut off through the capacitor 38 and then supplied to the switch circuit 39. The ripples of the output of the switch circuit 39 are removed through the recovery circuit 48 and then supplied to the high frequency transformer 41 to output a high frequency and high voltage signal. Here, the snubber circuit 49 serves to protect the switch circuit 39 from an excessive current.

The high frequency and high voltage signal is rectified by the capacitors 42 and 44 and the diodes 43 and 45 all connected to the secondary winding 41b of the high frequency transformer 41, so that the dc voltage P6 of 150 V (V3) can be obtained at the first output terminal and the dc voltage P7 of 15 V (V2) can be obtained at the second output terminal of the frequency transformer 41, respectively. These negative dc voltages V2 and V3 are supplied to the respective circuits.

What is claimed is:

1. A bell signal generating circuit, comprising:
   means for generating a pulse signal and a direct current signal in synchronism with the pulse signal;
   a photo-coupler for removing a direct current component of the pulse signal to output a first signal;
   a filter connected to the photo-coupler, for removing higher harmonics of the first signal to output a second signal;
   a differential amplifier connected to the filter, for differentially amplifying the second signal to output a bell signal; and
   means, responsive to the direct current signal, for applying a direct current supply voltage to the differential amplifier.

2. A bell signal generating circuit to claim 1, wherein the voltage applying means comprises:
   an oscillator circuit, responsive to the direct current signal, for outputting a high frequency signal;
   a high frequency transformer, connected to the oscillator circuit, for increasing the high frequency signal to a specific voltage; and
   a rectifier circuit, connected to the high frequency transformer, for rectifying the voltage-increased high frequency signal to output the direct current supply voltage.

3. A method of generating a bell signal for a key telephone set, comprising the steps of:

generating a pulse signal and a direct current signal in synchronism with the pulse signal;

removing a direct current component of the pulse signal to output a first signal;

removing higher harmonics of the first signal to output a second signal;

differentially amplifying the second signal to output a bell signal by a differential amplifier; and applying a direct current supply voltage to the differential amplifier in response to the direct current signal.

* * * * *